United States Patent
Vehar et al.

(10) Patent No.: US 6,786,259 B2
(45) Date of Patent: Sep. 7, 2004

(54) LOCKING RING ASSEMBLY FOR WHEEL RIM ASSEMBLY

(75) Inventors: Christine Vehar, Highland Hts., OH (US); Michael Martini, Union, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 10/354,924

(22) Filed: Jan. 30, 2003

(65) Prior Publication Data

US 2003/0168143 A1 Sep. 11, 2003

Related U.S. Application Data

(60) Provisional application No. 60/353,971, filed on Jan. 31, 2002.

(51) Int. Cl.[7] .............................................. B60B 25/06

(52) U.S. Cl. ..................................................... 152/410

(58) Field of Search ................................ 152/396, 397, 152/398, 399, 409, 410; 301/9.1, 95.101

(56) References Cited

U.S. PATENT DOCUMENTS

| | | | | |
|---|---|---|---|---|
| 4,209,052 A | * | 6/1980 | French | 152/410 |
| 4,552,194 A | * | 11/1985 | Brown et al. | 152/410 |
| 4,635,695 A | * | 1/1987 | Frank et al. | 152/410 |
| 4,683,930 A | * | 8/1987 | Elam et al. | 152/410 |
| 5,086,821 A | * | 2/1992 | Russell et al. | 152/410 |
| 5,107,914 A | * | 4/1992 | Yamoto et al. | 152/409 |
| 5,259,430 A | * | 11/1993 | Smith et al. | 152/410 |

* cited by examiner

*Primary Examiner*—Russell D. Stormer
(74) *Attorney, Agent, or Firm*—Renner, Otto, Boisselle & Sklar, LLP

(57) ABSTRACT

A locking ring assembly for a wheel rim assembly is disclosed. The locking rim assembly includes a locking ring, a retaining key and a clip. The locking ring assembly has a transverse split defining circumferentially opposing terminal ends, and the terminal ends include respective radially outwardly opening recesses. The retaining key has opposite end portions respectively received and circumferentially retained within the radially outwardly opening recesses in the respective terminal ends of the locking ring for holding the terminal ends of the locking ring adjacent one another. The clip engages and restrains the retaining key from radially outward movement from the recesses.

20 Claims, 3 Drawing Sheets

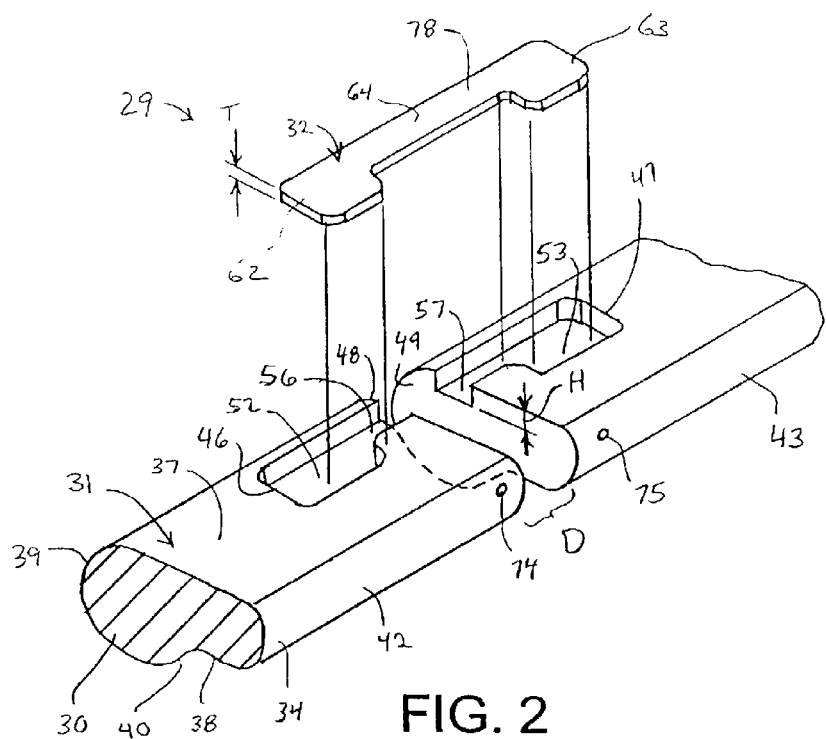
FIG. 2
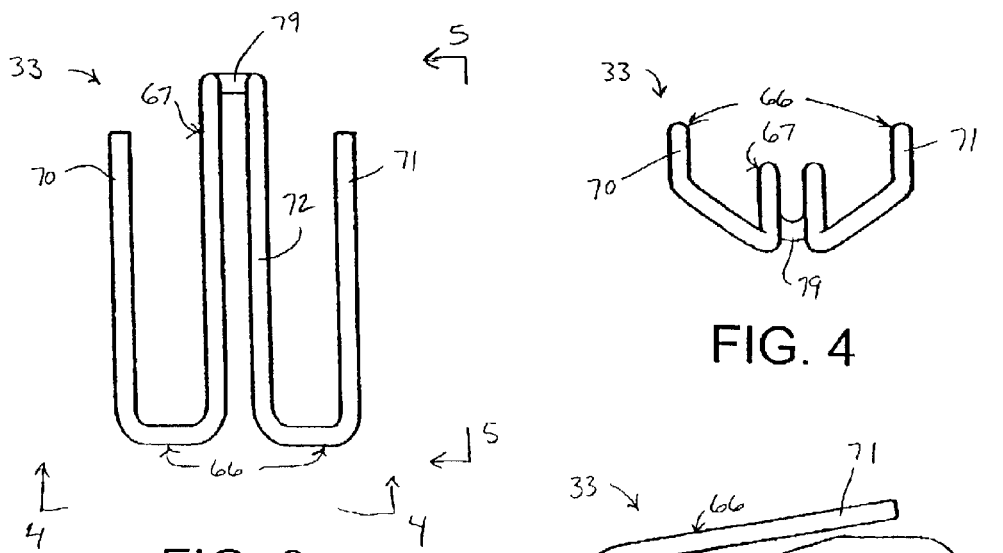
FIG. 3
FIG. 4
FIG. 5

LOCKING RING ASSEMBLY FOR WHEEL RIM ASSEMBLY

This application claims the benefit of U.S. Provisional Application No. 60/353,971, filed on Jan. 31, 2002 which is hereby incorporated herein by reference in its entirety.

FIELD OF THE INVENTION

This invention relates to a wheel rim assembly and more particularly to a new and improved locking ring assembly for a separable wheel structure.

BACKGROUND OF THE INVENTION

Wheel assemblies, and more particularly wheel assemblies provided for aircraft, are well known. One such wheel assembly is a two piece structure that utilizes a wheel base (with an integral wheel rim member) and a separable wheel rim member that is secured to the wheel base by a locking ring. The locking ring is split to enable the locking ring to be circumferentially expanded and installed onto the wheel assembly. The base has a groove for receiving the locking ring and the separable wheel rim member has a recessed ledge that circumscribes the locking ring when the wheel rim member is urged axially outwardly against the locking ring. The ledge functions to retain the locking ring in the groove as long as the wheel rim member is held axially against the locking ring.

A pneumatic tire is mounted on the wheel base followed by the wheel rim member and finally by the locking ring. When the tire is inflated, the inboard and outboard beads are urged relatively axially apart to seat the separable wheel rim member against the locking ring.

In the event of a loss of inflation pressure, such as a tire blowout, the separable wheel rim member may move axially inwardly such that the locking ring no longer is surrounded by the ledge of the separable wheel rim member. This may allow the locking ring to be thrown off of the wheel rim by the high centrifugal forces which are present.

Various devices and methods have been employed to prevent the locking ring from being thrown from the wheel assembly. One such method is to thread opposite ends of a lock wire into respective holes in the terminal ends of the locking ring and then twist the ends of the lock wire together. Although this method is commonly used in the industry, it can be tedious and inconvenient. In another prior art approach, a lock wire is used to retain a buckle which, in turn, connects the terminal ends of the locking ring. Although an acceptable method in retaining the locking ring, the buckle and the ends of the lock wires remain directly exposed to the rigors of the environment.

SUMMARY OF THE INVENTION

The present invention provides a locking ring assembly for a wheel rim assembly. The locking rim assembly includes a locking ring, a retaining key inserted into recesses in the terminal ends of the locking ring to maintain the terminal ends adjacent one another, and a clip for securing the retaining key relative to the terminal ends of the locking ring.

According to an aspect of the invention, a locking ring assembly includes a locking ring, a retaining key and a clip. The locking ring has a transverse split defining circumferentially opposing terminal ends that include respective radially outwardly opening recesses. The retaining key has opposite end portions respectively received and circumferentially retained within the radially outwardly opening recesses in the respective terminal ends of the locking ring, thereby holding the terminal ends of the locking ring adjacent one another. The clip engages and radially restrains the retaining key in the recesses, i.e., restrains the retaining key from radially outward movement out of the recesses.

The retaining key preferably includes transversely enlarged end retainer portions and a reduced width bridge portion therebetween, and the recesses include corresponding enlarged end portions for radially receiving the respective enlarged end retainer portions, and reduced width portions for radially receiving the reduced width bridge portion. The terminal ends of the locking ring may be circumferentially spaced apart when installed on a wheel base and the bridge portion may span the space between the enlarged end recessed portions. One or both of the enlarged end retainer portions of the retaining key may be smaller in circumferential extent than the respective enlarged end portion of the recess to which it corresponds, such that the retaining key is restrained for limited circumferential movement relative to the locking ring.

The clip preferably is a spring clip including a first portion engaging the locking ring and a second portion engaging the retaining key, which first and second portions are resiliently biased towards one another. The clip may be formed from a continuous length of wire having an intermediate section forming the second portion and opposite end portions forming the first portion. Also, the opposite end portions may be disposed in respective axially extending holes in the locking ring and the intermediate section may extend over the retaining key. Further, the intermediate section of the clip may be reversely bent on itself to form a pair of legs joined by a connecting portion, and the connecting portion may be bent radially to overlap an axial side surface of the retaining key, such that the clip is retained in place. Still further, the recesses may include corresponding reduced width recessed portions which together radially receive the reduced width bridge portion, while the axial holes open to the reduced width recessed portions and the opposite end portions of the clip extend through the axial holes and over the bridge portion of the retaining key to prevent radially outward movement of the retaining key from the recesses.

According to another aspect of the invention, a wheel rim assembly includes a wheel base, a separable wheel rim member, and a locking ring assembly as set forth above. The locking ring is received within a groove in the wheel base to secure the wheel rim member to the wheel base.

According to a further aspect of the invention, there is provided a method of installing a locking ring in a wheel base, comprising seating the locking ring in a groove in the wheel base, the locking ring having a transverse split defining circumferentially opposing terminal ends, the terminal ends including respective radially outwardly opening recesses, inserting a retaining key having opposite end portions into the respective outwardly opening recesses, axially inserting a first portion of a clip in an axial hole in the locking ring, flexing a second portion of the clip relative to the first portion of the clip, the first and second portions being biased towards one another, extending the second portion over the retaining key, and releasing the second portion, whereby the second portion engages the retaining key to restrain the retaining key from radially outward movement from the recesses.

According to a further aspect of the invention, there is provided a locking ring assembly for a wheel rim assembly, the locking rim assembly including a locking ring, a retaining key and a resilient push-on clip. The locking ring has a transverse split defining circumferentially opposing terminal ends, and the terminal ends have recesses. The retaining key has opposite end portions that are inserted into the recesses and circumferentially captured in the recesses. The resilient push-on clip has a first arm for engaging at least one terminal end of the locking ring and a second arm resiliently biased towards the first arm for engaging and holding the retaining key in the recesses.

The invention also provides a novel locking ring, retaining key and clip, as above defined.

The foregoing and other features of the invention are hereinafter fully described and particularly pointed out in the claims, the following description and the annexed drawings setting forth in detail illustrative embodiments of the invention, such being indicative, however, of but a few of the various ways in which the principles of the invention may be employed.

BRIEF DESCRIPTION OF THE DRAWINGS

FIG. 2 is an exploded perspective view of the terminal end portions of a locking ring and retaining key of a locking ring assembly according to the present invention.

FIG. 3 is a plan view of a clip of the locking ring assembly according to the present invention.

FIG. 4 is an end view of the clip of FIG. 3, as viewed from the line 4—4 in FIG. 3.

FIG. 5 is a side elevational view of the clip of FIG. 3, as viewed from the line 5—5 in FIG. 3.

DETAILED DESCRIPTION

Figure 1:
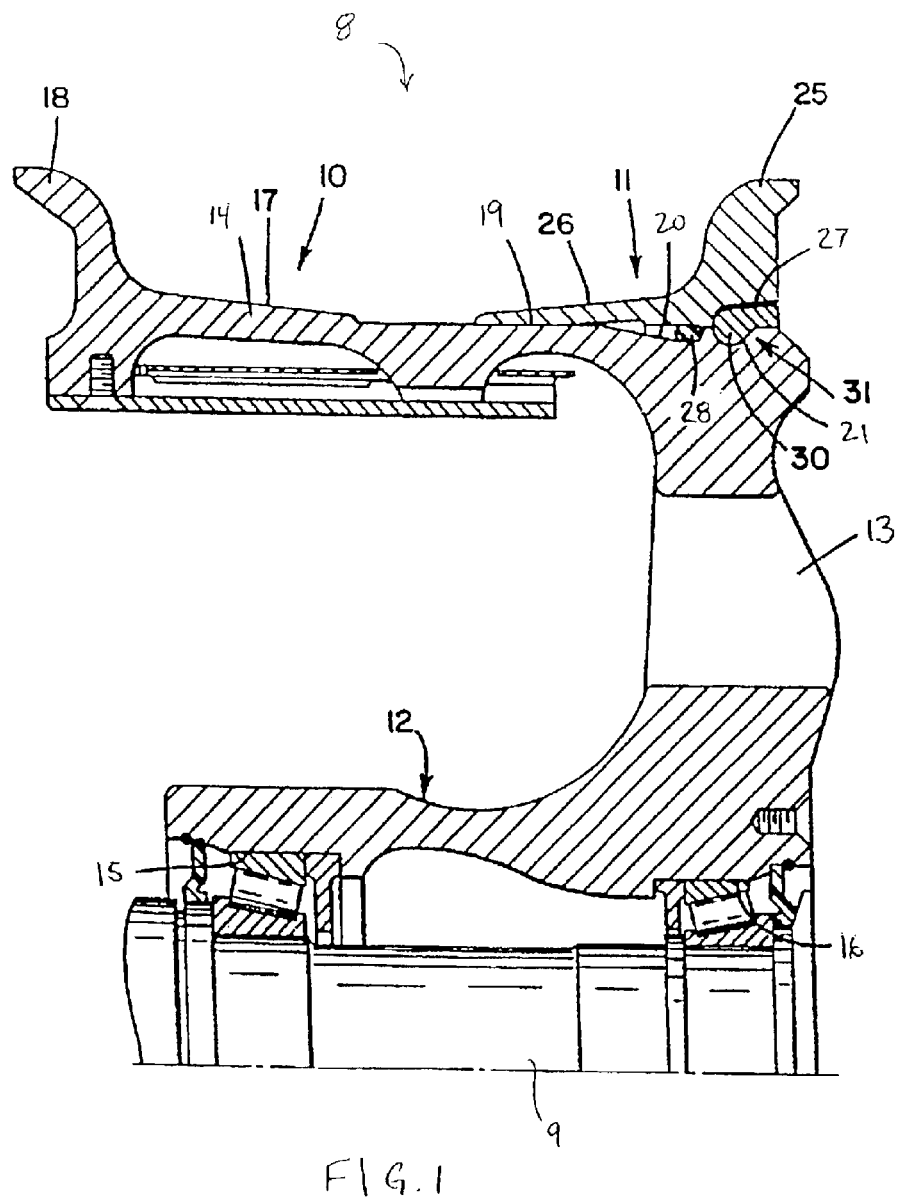
FIG. 1 is a cross-sectional half view of a wheel assembly including a locking ring, the other half of the wheel assembly being a mirror image of the half that is shown.

Referring now in detail to the drawings, wherein like reference numerals designate like or corresponding parts throughout the several views, there is shown in FIG. 1 a wheel assembly 8 for mounting on a nonrotatable axle 9. The wheel assembly 8 includes a wheel base 10 and a separable cylindrical wheel rim member 11 which together support a tire (not shown) thereon.

The wheel base 10 has a cylindrical hub portion 12, a web portion 13, and an axially extending tube well or cylindrical wheel section 14. The hub portion 12 has a pair of axially spaced annular recesses 15 and 16 that receive suitable bearings for supporting the wheel for rotation on the axle 9. The web portion 13 extends radially outwardly from one side of the hub portion 12 and terminates into the cylindrical wheel section 16. The web portion 13 may be a solid radially extending section or have a plurality of circumferentially spaced recesses to define spokes that interconnect the cylindrical wheel section 14 to the hub 12.

The cylindrical wheel section 14 has an outer annular surface 17 that tapers axially outwardly from its mid section towards one edge portion (to the left in FIG. 1) that forms an annular rim flange 18. The outer annular surface 17 is generally cylindrical from its mid section to its other edge portion opposite to the rim flange 18, as is indicated at reference number 19. A pair of circumferentially extending grooves 20 and 21 are disposed adjacent to the other edge portion.

The cylindrical wheel rim member 11 has an annular rim flange 25 that terminates into an annular axially extending leg portion 26 that tapers radially inwardly. The annular rim flange 25 has a radially inwardly opening circumferentially disposed recess 27 that is curved to compliment the annular groove 21 in the wheel base 10. An annular lobe-shaped portion 30 of a locking ring 31 is received within the recess 27 of the rim member 11 and the groove 21 of the wheel base 10. As is more fully described below, the locking ring 31 functions to secure the wheel rim member 11 to the wheel base 10.

In assembling the wheel assembly, an uninflated pneumatic tire is slid onto the wheel base 10. The wheel rim member 11 is then slid onto the wheel base 10, with its annular rim flange 25 beyond the grooves 20 and 21. A sealing gasket 28 is mounted within the groove 20. The split locking ring 31 is then positioned into the groove 21 and connected in a manner more fully described below. The pneumatic tire is then inflated and the respective beads of the tire exert a separating force on the respective rim flanges 18 and 25. This force moves the wheel rim member 11 rightwardly (as viewed in FIG. 1) relative to the wheel base 10 until the recessed portion 27 of the wheel rim member 11 engages the lobe-shaped portion 30 of the locking ring 31. With the full pressurization of the tire on the wheel assembly 8, the locking ring 31 firmly secures the wheel rim member 11 on the wheel base 10.

Referring now to FIGS. 2–8, there is shown a locking ring assembly 29 in accordance with the present invention. The locking ring assembly 29 includes the locking ring 31, a retaining key 32 which limits circumferential expansion and contraction of the locking ring 31 in the aforementioned groove 21 of the wheel base 10, and a clip 33 which secures the retaining key 32 in recessed portions of the locking ring 31.

Turning to FIG. 2, the locking ring 31 includes an annular one piece strip having a radially enlarged lobe-shaped portion 30 and a relatively thinner portion 34. The thinner portion 34 is generally rectangular in cross-section and has radially outer and inner surfaces 37 and 38. The lobe-shaped portion 30 has a curvilinear portion 39 which at one end merges into a linear portion that is coincident with the outer linear portion 37, and at the opposite end terminates into a linearly extending portion 40 that intersects the lower linear portion 38 of thinner portion 34. The configuration of the circumferentially extending groove 21 is complimentary to the configuration of the annular lobe portion 30 of the locking ring 31.

The locking ring 31 is split transverse its circumference to define circumferentially opposing terminal ends 42 and 43. The split in the locking ring 31 enables the locking ring 31 to be enlarged and placed over the cylindrical portion 19 of the wheel base 10. Upon release, the locking ring 31 springs back for seating into the annular groove 21. Also, as is described in greater detail below, the terminal ends 42 and 43 of the locking ring 31 form therebetween a space, D (FIG. 2), which increases and decreases in size as the locking ring 31 expands and contracts.

The terminal ends 42 and 43 of the locking ring 31 include respective radially outwardly opening recesses 46 and 47 which receive therein corresponding ends of the retaining key 32. The recesses 46 and 47 are disposed circumferentially inwardly of the respective opposite end faces 48 and 49 of the terminal ends 42 and 43. More particularly, the recesses 46 and 47 comprise, respectively, transversely enlarged end recessed portions 52 and 53 inwardly of the end faces 48 and 49, and reduced width recessed portions 56 and 57 which extend from the enlarged recessed portions 52 and 53 to the end faces 48 and 49.

The retaining key 32 includes corresponding transversely enlarged end portions 62 and 63 and a reduced width bridge portion 64 that are inserted and received in the respective enlarged recessed portions 52 and 53 and reduced width recessed portions 56 and 57. As its nomenclature suggests, the bridge portion 64 of the retaining key 32 bridges the space D between the terminal ends 42 and 43 of the locking ring 31. The retaining key 32 is sized for circumferential movement within the corresponding recessed portions 46 and 47. In the illustrated embodiment, this sliding movement is facilitated by the enlarged end portions 62 and 63 of the retaining key being smaller in circumferential extent than the enlarged end recessed portions 52 and 53. It will be appreciated that only one of the enlarged end portions 62 and 63 need be smaller in circumferential extent than its respective recessed portion 52 and 53 to enable such circumferential movement. As is further described below, the retaining key 32 is restrained for limited circumferential movement relative to the locking ring 31 by means of walls of the enlarged end recessed portions 52 and 53 limiting movement of the enlarged end portions 62 and 63 of the retaining key 32.

Turning now to FIGS. 3, 4 and 5, a clip 33 of the locking rim assembly 29 is shown, respectively, in plan, end and side view. As was alluded to above, the clip 33 retains the retaining key 32 in the recesses 46 and 47 of the locking ring 31.

Figure 6:
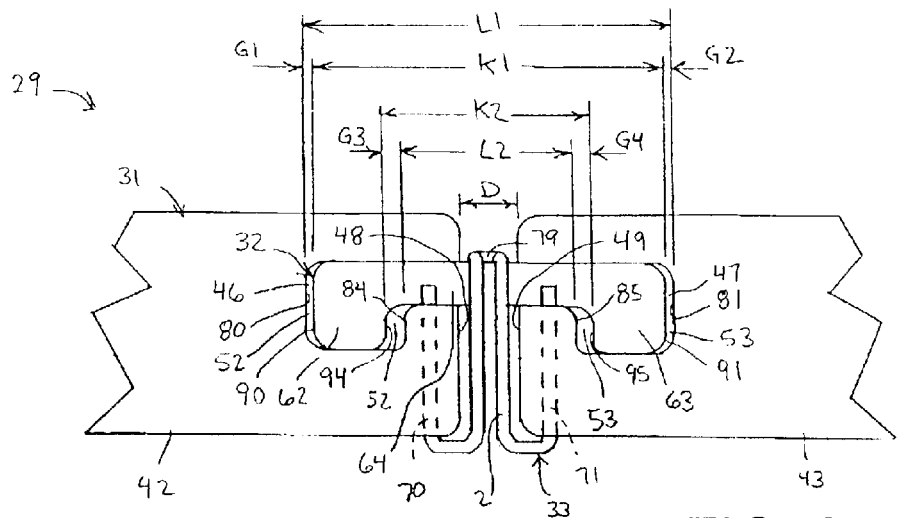
FIG. 6 is a fragmentary plan view of the locking ring assembly according to the present invention, the locking ring being shown in an unflexed configuration
Figure 7:
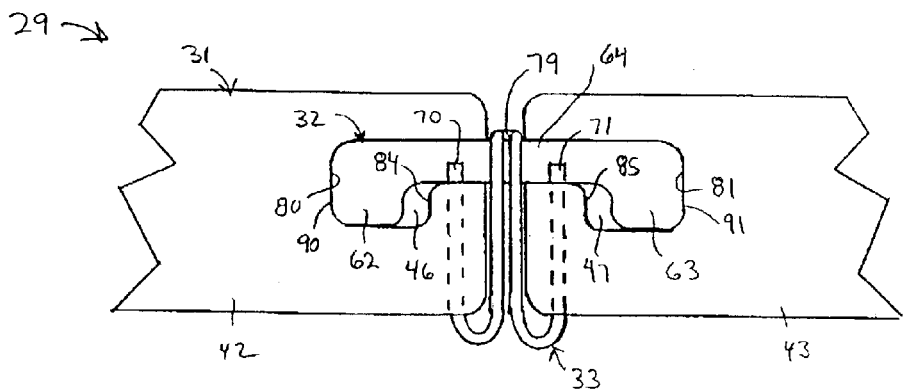
FIG. 7 is a fragmentary plan view of the locking ring assembly according to the present invention, the locking ring being shown in a contracted state.
Figure 8:
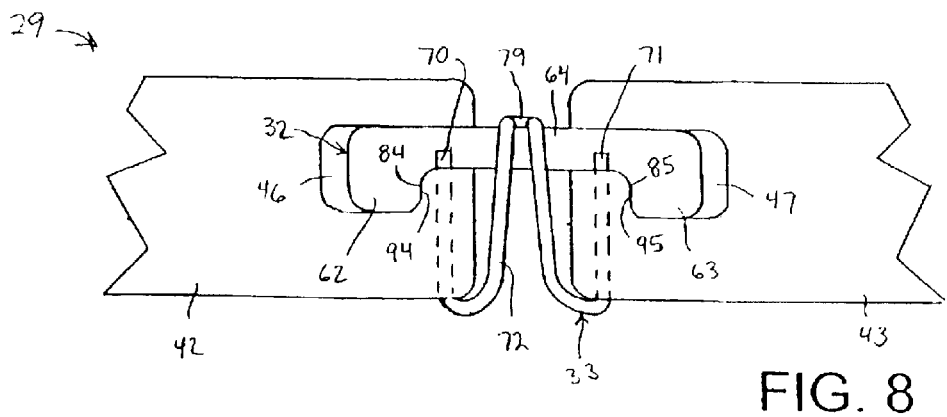
FIG. 8 is a fragmentary plan view of the locking ring assembly according to the present invention, the locking ring being shown in an expanded state.

The clip 33 may be any suitable resilient connecting member, for example a spring, which includes a first portion 66 for engaging the locking ring 31 and a second portion 67 for engaging the retaining key 32. The first and second portions 66 and 67 of the clip 33 are biased towards one another. In the illustrated embodiment, the clip 33 is a continuous length of stainless steel wire having opposite end portions 70 and 71 which form the first portion 66, and an intermediate section 72 therebetween which forms the second portion 67. The opposite end portions 70 and 71 are inserted into respective axial holes 74 and 75 (most clearly shown in FIG. 2) in the thinner portion 34 of the locking ring 31 with the intermediate section 72 being interposed between the terminal ends 42 and 43 of the locking ring 31 (FIGS. 6–8). Referring to FIG. 2, it will be recognized that the thickness, T, of the retaining key 32 is less than the depth H of the recesses 46 and 47 such that when the retaining key 32 is disposed in the recesses 46 and 47, a space is formed between the planes defined by the radially outer surface 78 of the retaining key 32 and the radially outer surface 37 of the locking ring 31. The intermediate section 72 extends through the space and exerts a biasing force against the radially outer surface of the retaining key 32 to restrain radially outward movement of the retaining key 32 from the recessed portions 46 and 47.

The retaining key 32 also may be radially restrained by the opposite end portions 70 and 71 of the clip 33. Referring again to FIG. 2, the axial holes 74 and 75 lie in a plane above the radially outer surface 78 of the retaining key 32 (when the retaining key 32 is in the recesses 46 and 47) and extend through the terminal ends 42 and 43, and open to the recessed portions 46 and 47 of the locking ring 31. As is shown in FIGS. 6–8, the opposite end portions 70 and 71 of the illustrated clip 33 extend through the axial holes 74 and 75 and relatively axially adjacent to the retaining key 32. In this position, the opposite end portions 70 and 71 restrain radially outward movement of the retaining key 32 from the recessed portions 46 and 47.

The intermediate section 72 also is reversely bent on itself to form a pair of legs joined by a connecting portion 79 which extends radially inwardly to overlap an axial side surface of the retaining key 32. The connecting portion 79 engages the retaining key 32 to prevent the opposite end portions 70 and 71 of the clip 33 from moving out from the axial holes 74 and 75. It will be appreciated that the axial holes 74 and 75 in the terminal ends 42 and 43 of the locking ring 31 may extend axially through the terminal ends 42 and 43. In this way, the opposite end portions 70 and 71 of the clip 33 may be made to extend across the bridge portion 64 of the retaining key 29.

Referring to FIGS. 6–8, the locking ring assembly 29 is shown installed in the terminal ends 42 and 43 of the locking ring 31 three different configurations: an unflexed configuration, a flexed contracted configuration, and a flexed expanded configuration, respectively. As is shown in FIG. 6, the circumferential span L1 between outer circumferential walls 80 and 81 (i.e., the circumferential span of the recesses 46 and 47 and the space D) is greater than the outer circumferential span K1 of the retaining key 32 (i.e., from one outer face 90 to another outer face 91 of the retaining key 32), thus providing gaps G1 and G2. Also, the circumferential span L2 between inner circumferential walls 84 and 85 (i.e., the circumferential span of the reduced width recessed portions 56 and 57 and the space D) is less than the inner circumferential span K2 of the retaining key 32 (i.e., from one inner face 94 to another inner face 95 of the retaining key 32), thus providing gaps G3 and G4.

The circumferential gaps G1 and G2 provide a range over which the terminal ends 42 and 43 of the locking ring 31 can move circumferentially towards one another and, consequently, a range over which the locking ring 31 can contract relative to its unflexed configuration. FIG. 7 shows the locking ring assembly 29 in its fully flexed contracted configuration; that is, where the faces 90 and 91 of the retaining key 32 prevent further circumferentially inward movement of the outer walls 80 and 81 of the recesses 46 and 47.

Similarly, the circumferential gaps G3 and G4 provide a range over which the terminal ends 42 and 43 of the locking ring 31 can move circumferentially away from one another and, consequently, a range over which the locking ring 31 can expand relative to its unflexed configuration. FIG. 8 shows the locking ring assembly 29 in its fully flexed expanded configuration; that is, where the faces 94 and 95 of the retaining key 32 prevent further circumferentially outward movement of the inner walls 84 and 85 of the recesses 46 and 47.

Several advantages are realized by the present invention. The gaps G1, G2, G3 and G4 enable the locking ring 31 to expand and contract a predetermined amount. The locking ring 31 may contract, for example, to accommodate differences in tolerances in the groove 21 of the wheel base 10. Also, when the locking ring 31 is subjected to centrifugal forces, for example when the wheel rim assembly 8 reaches high speeds, the locking ring 31 may flex outwardly over the range provided by the gaps G3 and G4.

The locking ring assembly 29 does not have any loose parts. The clip 33 maintains a constant biasing load on the retaining key 31 in the recesses 46 and 47 and thus reduces or prevents chatter or the like of the retaining key 31 within the recesses 46 and 47. This biasing load is maintained whether the locking ring 31 is in an unflexed or flexed configuration.

The locking ring assembly 29 is simple to install. To install the locking ring assembly 29, the locking ring 31 is circumferentially enlarged and placed over the cylindrical portion 19 of the wheel base 10 (FIG. 1). Upon release, the locking ring 31 springs back for seating into the annular groove 21. The retaining key 32 is then inserted into the recesses 46 and 47 to bridge the space D therebetween and therefore connect the terminal ends 42 and 43 of the locking ring 31. The two opposite end portions 70 and 71 of the clip 33 are then inserted into the respective holes 74 and 75 in the thinner portion 34. As the opposite end portions 70 and 71 are inserted through the holes 74 and 75, the connecting portion 79 of the intermediate section 72 is raised against the biasing force in the clip 33 so that the connecting portion 79 will "clear" the retaining key 32. The opposite end portions 70 and 71 may then be fully inserted into the holes 74 and 75, whereupon the intermediate section 72, in attempting to spring back to its unflexed configuration, engages the radially outer surface 78 of the retaining key 32 to secure the retaining key 32 in the recesses 46 and 47. The wheel rim member 11 is then moved relative to the wheel base 10 in the manner described above, whereby the locking ring 31 firmly secures the wheel rim member 11 on the wheel base 10. Accordingly, the locking ring assembly 29 does not require special tools for installation. Moreover, there is no tedious twisting of wires involved, as in some prior art mechanisms.

It will be appreciated that, once installed, substantially the entire locking ring assembly 29 is between the wheel base 10 and wheel rim member 11. The retaining key 32, which is disposed within recesses 46 and 47 of the locking ring 31, is free from being bumped or damaged.

Although the invention has been shown and described with respect to certain embodiments, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A locking ring assembly for a wheel rim assembly, the locking rim assembly comprising:
   a locking ring having a transverse split defining circumferentially opposing terminal ends, and the terminal ends including respective radially outwardly opening, closed bottom, recesses;
   a retaining key having opposite end portions respectively received and circumferentially retained within the radially outwardly opening recesses in the respective terminal ends of the locking ring for holding the terminal ends of the locking ring adjacent one another; and
   a clip for engaging and restraining the retaining key from radially outward movement from the recesses.

2. A locking ring assembly for a wheel rim assembly, the locking rim assembly comprising:
   a locking ring having a transverse split defining circumferentially opposing terminal ends, and the terminal ends including respective radially outwardly opening recesses;
   a retaining key having opposite end portions respectively received and circumferentially retained within the radially outwardly opening recesses in the respective terminal ends of the locking ring for holding the terminal ends of the locking ring adjacent one another; and
   a clip for engaging and restraining the retaining key from radially outward movement from the recesses; and
   wherein the retaining key includes transversely enlarged end retainer portions and a reduced width bridge portion therebetween, and the recesses include corresponding enlarged end portions for radially receiving the respective enlarged end retainer portions and reduced width portions for radially receiving the reduced width bridge portion.

3. A locking ring assembly as set forth in claim 2, wherein the terminal ends of the locking ring are circumferentially spaced apart and the bridge portion of the retaining key spans the space between the enlarged end recessed portions.

4. A locking ring assembly as set forth in claim 3, wherein at least one of the enlarged end retainer portions of the retaining key is smaller in circumferential extent than the enlarged end portion of the respective recess, whereby the retaining key is restrained for limited circumferential movement relative to the locking ring.

5. A locking ring assembly for a wheel rim assembly. the locking rim assembly comprising:
   a locking ring having a transverse split defining circumferentially opposing terminal ends, and the terminal ends including respective radially outwardly opening recesses;
   a retaining key having opposite end portions respectively received and circumferentially retained within the radially outwardly opening recesses in the respective terminal ends of the locking ring for holding the terminal ends of the locking ring adjacent one another; and
   a clip for engaging and restraining the retaining key from radially outward movement from the recesses; and
   wherein the clip is a spring including a first portion engaging the locking ring and a second portion engaging the retaining key, and the first and second portions are biased towards one another.

6. A locking ring assembly as set forth in claim 5, wherein the clip is formed from a continuous length of wire having an intermediate section forming the second portion and opposite end portions forming the first portion.

7. A locking ring assembly as set forth in claim 6, wherein the opposite end portions are disposed in respective axial holes in the locking ring and the intermediate section extends over the retaining key.

8. A locking ring assembly as set forth in claim 6, wherein the intermediate section of the clip is reversely bent on itself to form a pair of legs joined by a connecting portion, and the connecting portion is bent radially to overlap an axial side surface of the retaining key, whereby the clip is retained in place.

9. A locking ring assembly as set forth in claim 7, wherein the recesses include corresponding reduced width recessed portions which together radially receive the reduced width bridge portion, and wherein the axial holes open to the reduced width recessed portions and the opposite end portions of the clip extend through the axial holes and over the retaining key to prevent radially outward movement of the retaining key from the recesses.

10. A locking ring assembly for a wheel rim assembly, the locking rim assembly comprising:

a locking ring having a transverse split defining circumferentially opposing terminal ends, and the terminal ends having recesses;

a retaining key having opposite end portions inserted into the recesses and circumferentially captured in the recesses; and a resilient push-on clip having a first arm for engaging at least one terminal end of the locking ring and a second arm resiliently biased towards the first arm for engaging and holding the retaining key in the recesses.

11. A locking ring assembly as set forth in claim 10, wherein the clip is formed from a continuous length of wire having an intermediate section forming the second arm and opposite end portions forming the first arm.

12. A locking ring assembly as set forth in claim 11, wherein the opposite end portions are disposed in respective axial holes in the locking ring and the intermediate section extends over the retaining key.

13. A locking ring assembly as set forth in claim 12, wherein the recesses include reduced width recessed portions which together radially receive the reduced width bridge portion, and wherein the axial holes open to the reduced width recessed portions and the opposite end portions of the clip extend through the axial holes and over the retaining key to prevent radially outward movement of the retaining key from the recesses.

14. A locking ring assembly as set forth in claim 11, wherein the intermediate section of the clip is reversely bent on itself to form a pair of legs joined by a connecting portion, and the connecting portion is bent radially to overlap an axial side surface of the retaining key, whereby the clip is retained in place.

15. A locking ring assembly as set forth in claim 10, wherein the retaining key includes transversely enlarged end retainer portions and a reduced width bridge portion therebetween, the recesses include enlarged and reduced width end portions for radially receiving the respective enlarged end retainer portions and reduced width bridge portion, respectively, and the transversly enlarged end retainer portions have a width greater than the width of the adjacent reduced width end portion.

16. A locking ring assembly as set forth in claim 15, wherein the terminal ends of the locking ring are circumferentially spaced apart and the bridge portion of the retaining key spans the space between the enlarged end recessed portions.

17. A locking ring assembly as set forth in claim 15, wherein at least one of the transversely enlarged end retainer portions of the retaining key is smaller in circumferential extent than the enlarged end portion of the respective recess, whereby the retaining key is restrained for limited circumferential movement relative to the locking ring.

18. A locking ring assembly as set forth in claim 15, wherein the transversely enlarged end retainer portions of the retaining key closely fit widthwise in the respective enlarged end portions of the respective recess.

19. A wheel rim assembly having an axis, comprising:

a wheel base;

a separable wheel rim member; and a locking ring assembly as set forth in claim 1, the locking ring being received within a groove in the wheel base to secure the wheel rim member to the wheel base.

20. A method of installing a locking ring in a wheel base, comprising:

seating the locking ring in a groove in the wheel base, the locking ring having a transverse split defining circumferentially opposing terminal ends, the terminal ends including respective radially outwardly opening recesses;

inserting a retaining key having opposite end portions into the respective outwardly opening recesses;

axially inserting a first portion of a clip in an axial hole in the locking ring;

flexing a second portion of the clip relative to the first portion of the clip, the first and second portions being biased towards one another;

extending the second portion over the retaining key; and releasing the second portion, whereby the second portion engages the retaining key to restrain the retaining key from radially outward movement from the recesses.

* * * * *